Oct. 20, 1970 W. VOLLMEYER 3,535,450

MULTIPLEX TRANSMISSION METHOD

Filed Nov. 29, 1967 2 Sheets-Sheet 1

Oct. 20, 1970 W. VOLLMEYER 3,535,450

MULTIPLEX TRANSMISSION METHOD

Filed Nov. 29, 1967 2 Sheets-Sheet 2

United States Patent Office 3,535,450
Patented Oct. 20, 1970

3,535,450

MULTIPLEX TRANSMISSION METHOD

Werner Vollmeyer, Munich, Germany, assignor to Siemens Aktiengesellschaft, Berlin and Munich, Germany Filed Nov. 29, 1967, Ser. No. 686,625
Claims priority, application Germany, Dec. 8, 1966, S 107,309
Int. Cl. H04l 5/00
U.S. Cl. 178—50 21 Claims

ABSTRACT OF THE DISCLOSURE

A method for transmitting a plurality of binary coded messages in time multiplex manner. A standardized telegraphy step speed is used and the method provides for the transmission of messages that comprise different step codes. Message transmission is accomplished in a manner that is compatible with existing commercial systems such as PCM systems.

BACKGROUND OF THE INVENTION

Field of the invention

The invention is directed to a method for transmitting a plurality of coded messages in time multiplex manner It has particular utility in telegraphy systems.

State of the prior art

The transmission of a plurality of coded messages by the time multiplex methods is well known in the prior art. However, the connection of time multiplex systems associated with prior art methods to existing system is limited because of differences in transmission speeds therebetween.

When messages are transmitted in binary coded form, it is essential to transmit indications of changes in the binary states of message channels associated with the time multiplex system. This is normally done immediately, and therefore a certain amount of the available transmission time is lost in transmitting such indications.

SUMMARY OF THE INVENTION

These and other defects of prior art methods are solved by the present invention which transmits a plurality of binary coded messages in a time multiplex manner that is compatible with existing telex or PCM systems. The method provides for the transmission of arhythmic messages at all speeds below a particular nominal step speed.

Notification of a change in the binary state of a message signal associated with the time multiplex system is transmitted in response to the transmission synchronization pulse associated therewith that immediately follows the modulation condition change in the message signal that corresponds to the change in its binary state. The time interval corresponding to several transmission synchronization pulses occurring after the modulation condition change is utilized for transmission of the notification signal corresponding to the change in the modulation condition of the message signal.

The notification signals comprise particular combinations of information bits in the form of binary pulse coded groups representative of the times at which changes in the modulation condition of the message signals occur.

The method described may employ various telegraph codes and can be used in conjunction with a telex network, just as a WT system. This is particularly advantageous because data transmission using the international telex network in conjunction with the time multiplex system is not precluded if it is not necessary to maintain a particular code, as for example, a 5-code.

If transmission is provided over regular speaking channels, modulation apparatus normally commercially employed may still be used because a standardized step speed is used to transmit the time multiplex signals. Therefore, the method provides an economical way of transmitting information over existing systems.

Further the method provides for the formation of channels capable of handling relatively high step speeds and it is compatible with existing PCM systems. Telegraphy distortions are maintained within a permissible range.

The method provides for the transmission of data at different step codes (for example, 6, 7, and 8, step codes) and also for the transmission of data wherein the information is identified by the frequency of steps of predetermined length, as for example, facsimile.

DETAILED DESCRIPTION OF THE INVENTION

Figure 1:
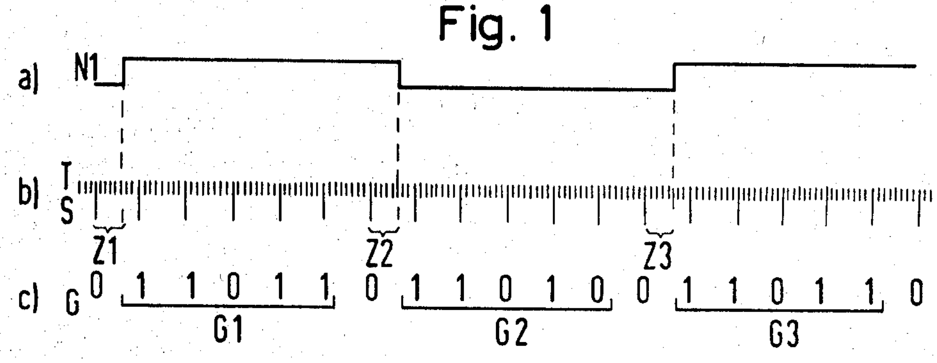
FIG. 1 shows the scanning and coding method employed in conjunction with time mutiplex transmission of telegraphy signals.

FIG. 1 shows the method according to the invention wherein graph *a* illustrates message N1 having a step speed of 50 Bd. that is to be transmitted. Therefore the theoretically shortest time duration of each step of the message is 20 ms.

Message N1 is periodically scanned along with other messages such that a time interval equal to period $t$ of a signal having a frequency of 2400 Hz. as shown in graph *b* is available for sampling message N1 at times S.

FIG. 1 thus shows in graph *b* that the message channel in which message N1 is present is connected to the common transmission path at every eighth period $t$. Seven additional messages (not shown) may be similarly periodically sampled and applied to the common transmission path at corresponding time periods $t$ occurring between successive cyclic transmission synchronization pulses S of message N1. The instant example is therefore illustrative of the time multiplex transmission of eight messages.

Message signal N1 may assume one of two electrical states corresponding to two binary states, if it is assumed that it is transmitted in binary form. Changes between binary states, as indicated by a change in the modulation condition of message signal N1, causes the transmission of a corresponding binary coded pulse group G as shown in graph *c* which fixes the points in time at which the changes occur. A counting system is employed to determine the time between successive transmission synchronization pulse S at which a change in the modulation condition of message N1 occurs. If such a change occurs between two transmission synchronization pulses S, the counting process is stopped and the existing count is converted into a corresponding binary coded pulse group for transmission to the common transmission path when the succeeding transmission synchronization pulse S effects sampling of channel N1. Time slots are thus defined between successive points in time designated "S." These are not necessarily representative of synchronization pulses, however, because other conventional methods can be used for the synchronization pulses.

Thus the sampled signal is transmitted to the common transmission path only if a change in the modulation condition of message N1 occurs. If the same modulation condition exists over an extended period of time, and more particularly, over the time interval of several transmission synchronization pulses S, a sampled signal is not applied to the common transmission path until the modulation condition thereof changes.

In FIG. 1, count Z1 corresponds to the time at which the first change in the modulation condition of message N1 occurs, as measured from the last occurring transmission synchronization pulses. As previously explained, the count is converted into a binary coded pulse group corresponding to the time at which the modulation condition changes. Thus binary coded pulse group G1 corresponds to count Z1 and is applied to the common transmission path in response to the next transmission synchronization signal S. The time of the second change in the modulation condition of message N1 is represented by count Z2, and the time of the third change by count Z3. Binary coded pulse groups G2 and G3 are representative of counts Z2 and Z3, respectively.

If it is assumed that the theoretical step speed of message N1 is 50 Bd., succeeding changes in the modulation condition of the message can occur after 20 ms. Therefore a relatively large portion of this time (20 ms.) may be used for transmission of the binary coded pulse group.

In this regard, each binary coded pulse group comprises five information bits. The first bit always has the same binary condition which, as shown in FIG. 1 may be assumed to be equal to binary 1. Thus, the first bit of each binary coded pulse group G1 is equal to binary 1 and is representative of the start criterion to inform the receiver that the succeeding four bits should be evaluated as information relating to a change in the modulation condition of the message. The second, third, and fourth bits are representative of the count of the counting system in binary code, and thus comprise the counts corresponding to Z1, Z2, or Z3 in binary form. The count may be derived, for example, by determining the number of scanning pulses T that occur from initiation of the count in response to a transmission synchronization pulse S until a change in modulation condition of the message occurs. The fifth bit of the binary coded pulse group G1 is indicative of the modulation condition that exists after the change in modulation condition occurs. Thus, binary 0 and binary 1 are alternately transmitted to the common transmission path by successive binary coded pulse groups as the fifth bit thereof. In the event that the natural redundancy of the binary coded pulse groups is not sufficient, additional bits may be provided as safety bits associated with the binary coded pulse groups to ensure correct evaluation of changes in modulation condition, with a corresponding increase in the scanning synchronization frequency T.

If a binary coded pulse group is not transmitted to the common transmission path in response to a transmission synchronization pulse S, a signal is applied to the common transmission path that is opposite to the modulation condition indicative of the start criterion. Thus, assuming that the start criterion is equal to binary 1, a binary 0 would then be applied to the common transmission path.

Figure 2:
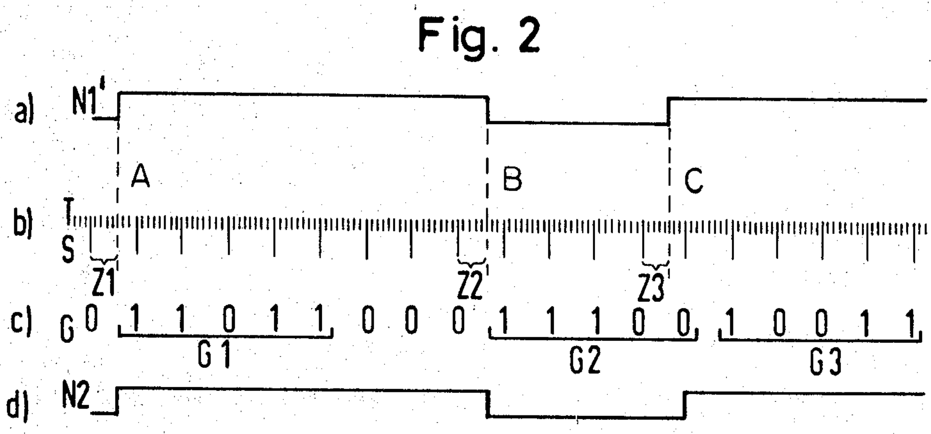
FIG. 2 shows the scanning and coding method employed in conjunction with time multiplex transmission of telegraphy signals wherein distortion in the time duration of steps is present.

FIG. 2 shows the scanning and coding principles of the method according to the invention described in relation to FIG. 1, with the exception that binary message N1′ is distorted. Graph *b* shows scanning periods *t* having a frequency equal to 2400 Hz. and transmission synchronization pulses S. The binary coded combinations G1, G2, and G3 are shown in graph *c*, and as explained above, are indicative of the times at which changes in the modulation condition of the message occur.

It may be assumed that message N1′ has a transmission speed equal to 50 Bd. Therefore, if the message is distorted, modulation segments thereof may have a time duration less than the theoretical step time duration of 20 ms. In this regard, it may be assumed that the corresponding actual time duration of successive undistorted steps having a theoretical time duration of 20 ms., is approximately 16⅔ ms.

Thus, graph *a* of FIG. 2 shows that the second modulation condition change B occurs approximately 7 ms. too late compared to the theoretically correct time, and this corresponds to a telegraph step distortion of approximately +35%. The third modulation condition change C, however, occurs at the theoretically correct time.

The first change in the modulation condition of message N1′ occurs at the theoretically correct time and is fixed by binary coded pulse group G1. The time at which the second modulation condition change occurs is fixed by binary coded pulse group G2. However, it is seen that the third modulation change of message N1′ C, occurs prior to the time at which binary coded pulse group G2 has been completely transmitted. The start criterion (binary 1) of binary coded pulse group G3 would then have to be transmitted with the transmission synchronization pulse S that follows the third change in condition occurring at time C. This, of course, would result in the transmission of inaccurate information to the common transmission path. The method according to the invention solves this problem by causing transmission of binary coded pulse group G3 to be initiated in response to the transmission synchronization pulse S that is produced after the last bit (bit 5) of binary coded pulse group G2. This does have the effect that the third modulation condition change occurring at time C, and represented by binary coded pulse group G3 is delayed in transmission to the receiver. Depending upon the phase position of the transmission synchronization pulse that initiates transmission of binary coded pulse group G3, an elongation of corresponding telegraphy step B–C of between ⅓ to 3⅔ ms., corresponding to a time distortion of between +1.7 to +18%, may occur.

If second change B in modulation condition of message N1′ is assumed to occur 7 ms. too soon, relative to the theoretically correct time, a telegraphy step distortion of −35% would result. However, the modulation change would not immediately be transmitted to the receiver, because transmission thereof must await the corresponding transmission synchronization pulse. Depending upon the phase position of said corresponding transmission synchronization pulse, the step produced at the receiver would have a time distortion of between −16⅔ and −33⅓%, and the step time distortion would thus be decreased relative to the time distortion percentage at the transmitter. Furthermore, the third modulation condition change produced at the receiver would not be distorted.

Graph *d* of FIG. 2 shows the message as reproduced at the receiver. The travel time associated with transmission between the transmitter and receiver has not, however, been taken into account. As evident from graph *d*, the isochronic telegraphy step distortion of message N2, corresponding to the reproduction of message N1′ at the receiver, is not increased compared to message N1′. Therefore, the method according to the invention, does not increase the isochronic telegraph step distortion, and in many instances, decreases the percentage distortion of predistorted messages applied to the transmitter. This is a distinct advantage over telegraphy frequency multiplex systems (WT systems).

The scanning and coding steps according to the invention are only effective when changes in the modulation conditions of messages present in the message channels occur. If a particular one of the two possible modulation conditions exists for an extended period of time as, for example, when a line is free, there is a possibility that a disturbance voltage or noise signal of a relatively short time duration may falsely result in evaluation of the other possible modulation condition.

In order to prevent this, additional steps are employed according to the invention wherein, after an appropriate period of time, for example, one minute, a confirmation of the permanent binary 0 or binary 1 state existing in a certain line is produced in the form of a particular corresponding binary coded combination. It is important that the binary coded combinations corresponding to the permanent binary 0 and binary 1 conditions differ from each other as much as possible; that is, the hamming-distance should be as great as possible. For example, the binary coded combination 11110 may be representative of permanent polarity corresponding to binary 0, and the binary coded combination 10001 may be representative of the permanent polarity corresponding to binary 1. This requires that the binary coded pulse groups applied to the common transmission path by the coders of the individual message channels be delayed by a time interval corresponding to the time duration thereof. Thus, changes in modulation condition of the individual messages occurring during transmission of binary coded combinations corresponding to the permanent polarity conditions may be applied to the common transmission path within the proper time. Thus, because of the delay time associated with transmission of the binary coded pulse groups, the transmission of binary coded combinations representative of permanent polarity conditions can be stopped when a change in modulation condition occurs.

Figure 3:
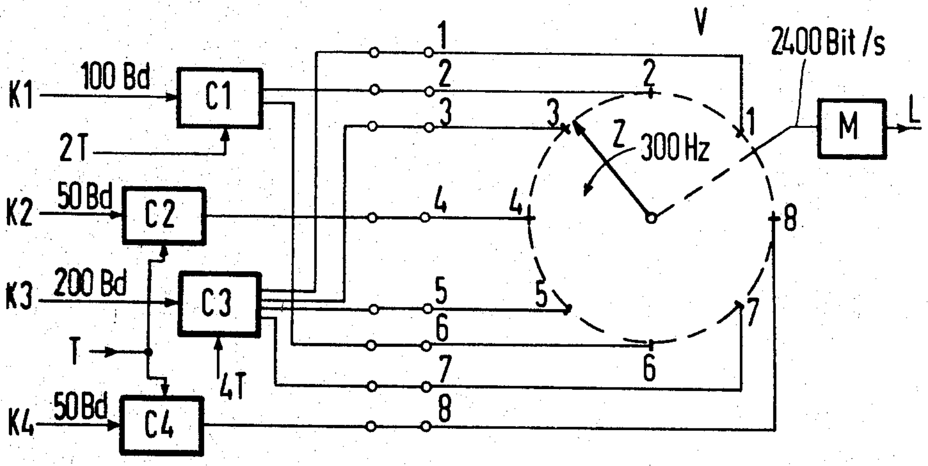
FIG. 3 illustrates the method according to the invention wherein one speaking channel is employed for transmission of a plurality of messages.

FIG. 3 illustrates an example of how individual message channels may be time interleaved into a common transmission path. According to the examples shown in FIGS. 1 and 2, eight 50 Bd. channels are associated with common transmission line L. Each of channels 1 through 8 has a coder that is scanned during an associated period of scanning synchronization frequency T equal to 2400 Hz. Thus, all eight channels are sampled at a transmission synchronization pulse frequency S equal to 300 Hz., and the phase position associated with the sampling of each of the eight channels is different. Thus, at each scanning pulse T, one of the eight channels is connected through the associated coder and distributor to the common transmission path. Thereby information is applied to the common transmission path at the rate of 2400 bit/s.

The eight 50 Bd. channels may be combined into channels having higher telegraphy step speeds. FIG. 3 illustrates this, and shows that instead of eight 50 Bd. channels, four channels K1 through K4 having different step speeds may be employed. Message channels K1 through K4 are respectively connected to coders C1 through C4. The output signals of the coders are applied to distributor V, the mode of operation of which is well known and therefore shown only symbolically in the form of a rotating selector Z which rotates at the speed of the synchronization transmission signals S corresponding to a frequency of 300 Hz.

Connection of selector Z to the outputs of coders C1 through C4 effects application of the corresponding sampled messages to modulator M, and thereby to common transmission line L. To simplify the circuit, modulator M may be removed or an electronic delay may be substituted therefor. Coders C1 through C4 comprise a counting system, and produce binary coded pulse groups when the changes in the modulation condition of the associated message signal occurs as explained above, that are applied to common transmission path L by distributor V in timely interleaved manner. Coders C1 through C4 are similar and operate at a transmission speed of 50 Bd. with a scanning synchronization frequency equal to 240 Hz. If the messages are transmitted at higher transmission speeds, the message is distributed into several 50 Bd. channels and the corresponding coder therefore operates at a higher transmission speed and employs a higher scanning synchronization frequency. For example, with reference to coder C1, message channel K1 employs a transmission speed of 100 Bd. Therefore, a scanning synchronization signal having a frequency of 2T (4800 Hz.) is applied to coder C1. The pulse groups formed are distributed by the coder to two distribution points (2 and 6) of distributor V, so that channel K1 is sampled twice during each cycle of the distributor selector Z.

Similarly, it is seen that message channel K3 functions at a transmission speed of 200 Bd., and therefore requires the application to associated coder C3 of a scanning synchronization frequency equal to 4T (9600 Hz.). The four pulse groups produced by coder C3 are distributed to four distribution points (1, 3, 5, 7), corresponding to four 50 Bd. channels. Distributor V thus samples message channel K3 four times during each selector cycle.

The method further provides the advantage that a common coder may be utilized by all message channels. Then the messages present in channels K1 through K4 are directly connected to the distribution points of distributor V. For example, channel K1 may be connected to distribution points 2 and 6; channel K3 may be connected to distribution points 1, 3, 5, and 7; and channels K2 and K4 may be connected to distribution points 4 and 8, respectively. Selector Z of distributor V then rotates at a speed of 24 kHz. to produce an information flow of 19,200 bit/s. that is applied to a common coder interposed between selector Z and modulator M. Thus information may be transmitted to the common transmission line L from modulator M at a rate of 2400 bit/s. (19,200÷8).

Even where attenuation and travel time distortions are introduced, transmission may be effected over a speaking channel at a speed of 2400 Bd. at binary modulation. With multistage modulation greater than binary, even higher step speeds can be obtained.

The receivers must be synchronized to receive the correct message present in channels K1 through K4. This may be accomplished, for example, by utilizing a 50 Bd. channel for transmission of synchronization signals. Since only eight 50 Bd. channels may be formed per TF channel, it may not be desirable to substitute a possible information or message channel to transmit synchronization signals for use by the receiver. An altenative is to transmit the synchronization criteria by using a third modulation condition, or by utilizing a relatively narrow auxiliary channel.

The employment of ternary modulation provides a third modulation condition that may be employed for transmission of the synchronization criteria. However, when a TF channel is employed to transmit the desired information, it is advantageous to employ a narrow auxiliary channel outside of the speaking band so that the message transmission frequency range is not limited. When the message is transmitted over a PCM system, a great many 50 Bd. channels are available, and it is therefore most advantageous to employ a 50 Bd. for transmission of the synchronization criteria.

Figure 4:
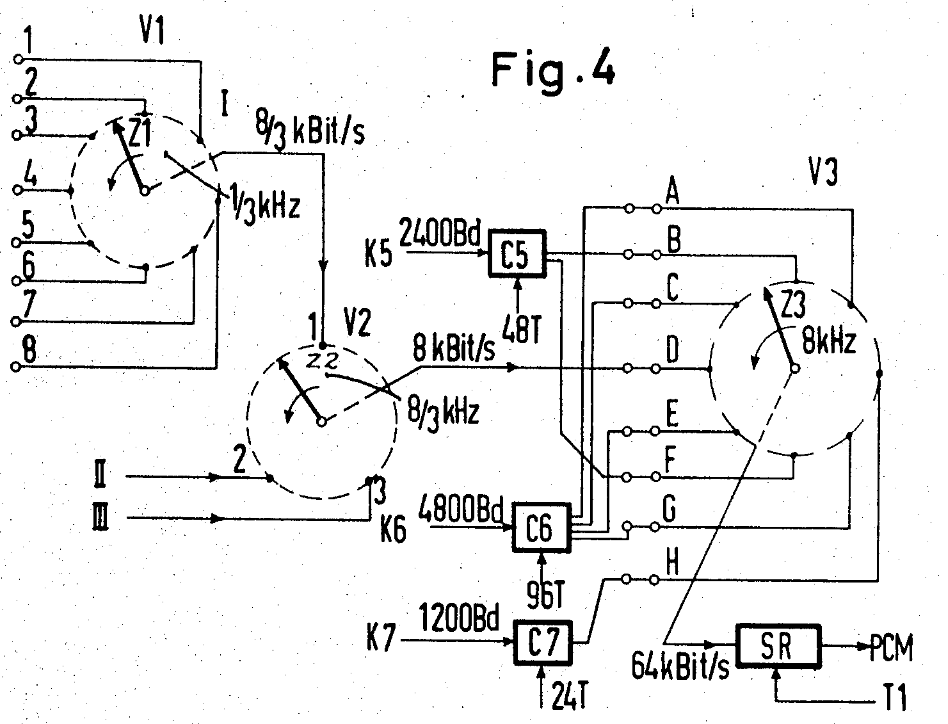
FIG. 4 illustrates the method according to the invention for use in conjunction with a PCM system.

FIG. 4 shows the application of the method according to the invention with respect to transmission of the messages over PCM channels. This requires a change in the frequency of the channing synchronization pulses associated with the time multiplex method employed so that they are compatible with the synchronization frequency of the PCM system. Thus, for example, the frequency of the scanning synchronization pulses of a 50 Bd. channel would be increased from 300 Hz. to 1/3 kHz. The method then functions as described above. The transmission synchronization signals are derived through division of the synchronization frequency associated with the PCM systems (1536 kHz.), and thereby the time multiplex transmission system may be controlled through the PCM system.

FIG. 4 is representative of a modification of the method described in relation to FIG. 3. Thus system I comprises eight message channels 1 through 8 operating at a transmission speed of 50 Bd. that are connected to corresponding distribution points of distributor VI. Selector Z1 of distributor V1 rotates at a speed of 1/3 kHz., and the rate of information flow developed by the distributor is thereby equal to 8/3 k. bit/s. at the distributor output. However, the output of distributor V1 is not connected to a modulator, but instead is connected to a distribution point of distributor V2, having a selector Z2 that rotates at a speed of 8/3 kHz. Thus distributor V2 may be employed to receive the outputs of several systems of type I. For example, systems II and III may be connected to distribution points 2 and 3 of distributor V2. Alternatively, 50 Bd. channels may be connected to distribution points 2 and 3, and are then directly scanned or sampled by selector Z2. When direct scanning is so employed, the modulation condition is ascertained at each scanning pulse and the result obtained is applied directly to the common transmission line. Thus, binary coded pulse groups indicative of changes in modulation condition are not transmitted. If it is assumed that a step speed of 2400 Bd. is employed, a 50 Bd. channel may be transmitted on the line. This is advantageous if the line, as for example a local network line, is inexpensive. If more expensive lines as, for example, in long distance networks are used, the speaking channel should be employed more advantageously, and the information derived by scanning should therefore be coded.

An interleaved message flow of 8 k. bit/s. is produced at the output of distributor V2 corresponding to a telegraphy message rate of 1200 bit/s. For example, this may be produced by 3×8 or 24 channels operating at 50 Bd. Thus, a 1200 Bd. channel could also be connected to distribution point D of distributor V3, which as shown is connected to selector Z2 of distributor V2. It is possible to connect eight channels having a transmission speed of 1200 Bd. to distribution points A through H of distributor V3, and this provides the possibility that two channels operating at 2400 Bd. or four channels operating at 4800 Bd. may be joined together according to the principles shown in relation to FIG. 3.

For example, information at the rate of 4800 Bd. is applied to coder C6, the output of which is connected to distribution points A, C, E, and G of distributor V3. A corresponding synchronization frequency of 96T is applied to coder C6 to produce the desired outputs to the distribution points. Message channel K5 applies the message present therein at a speed of 2400 Bd. to coder C5, the scanning synchronization frequency thereof being equal to 48T, wherein $T=8/3$ kHz. The pulse groups thus formed and applied by coder C5 are scanned by selector Z3 at distribution points B and F of distributor V3.

As explained above, message channel K6 applies the message present therein at a speed of 4800 Bd. to coder C6, and the binary coded pulse groups produced are applied to distribution points A, C, E, and G that are scanned by selector Z3 which rotates at a speed of 8 kHz. Message channel K7 applies the message present therein at a speed of 1200 Bd., which corresponds to the three systems I, II, and III. Code C7 is scanned with a scanning synchronization frequency of 24T ($T=8/3$ kHz.), and the output thereof is connected to distribution point H of distributor V3. Thus, distributor V3 is capable of producing a rate of information flow equal to 64,000 bit/s., which is just sufficient to fill a PCM channel.

In each time segment or slot that a PCM system makes available for use by one of the 24 PCM channels in an 8 kHz. synchronization system for example, at least seven bits, and in some instances eight bits, per channel may be applied to the common transmission line. The eight bit per channel time segment must in most cases be made available for synchronization of the PCM system. However, in some channels, eight bits are available for information transmission.

The seven or eight bits can be assigned to seven or eight 1200 Bd. channels. Distributor V3 in FIG. 4 is intended for this purpose. Thus, the message flow of 64,000 bit/s. produced at the output of distributor V3 is applied to an eight digit shift register SR, the contents of which are emptied by the pulses of the PCM channel scanning frequency of 8 kHz. at a speed of 1536 k. bit/s.

If only seven, instead of eight bits are available per channel time segment, the channels are still associated with a distributor having eight distribution points, in order to make possible the forming of channels for 2400 and 4800 Bd. speeds. The channel at distribution point H, for example, is then seized by the synchronization signal requested by the PCM system. The PCM channel synchronization signal T1 is applied to shift register SR with the signal of frequency 8 kHz. The required scanning synchronization pulses are obtained from the PCM line synchronization signal the frequency of which is 1536 kHz.

Shift register SR is required if a character-time-interleaving of seven or eight bits each in the the PCM system is involved. If a bit-time-interleaving is employed, shift register SR is not necessary and the output of distributor V3 is applied directly to the PCM system.

Figure 5:
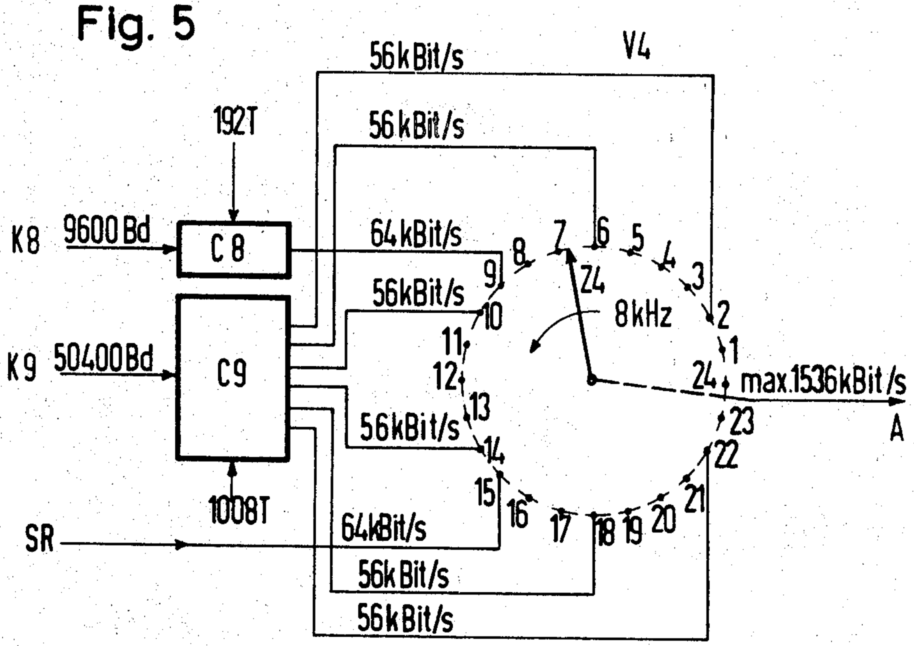
FIG. 5 illustrates the method according to the invention for use in conjunction with a PCM system, wherein relatively high step speeds are used.

FIG. 5 shows the connection of several PCM systems into data channels employing step speeds greater than 4800 Bd. In order to connect several PCM channels in such a manner, an additional distributor V4 is connected between shift register SR and the PCM system. Thus, shift register SR supplies an information flow of 64,000 bit/s. to distribution point 15 of distributor V4. The message in message channel K8 is applied to coder C8 at a transmission speed of 9,600 Bd., which scans the message with a scanning sychronization frequency of 192T, wherein $T=8/3$ kHz. Thus an information flow of 64,000 bit/s. is produced at the output of coder C8 which corresponds to a PCM channel connected to distribution point 9.

Six PCM channels may be switched to provide message channel K9 that functions at a step speed of 50,400 Bd. This step speed may also be transmitted easily within the primary (60 to 108 kHz./band) of a TF system, by employing residual side-band modulation. Channel K9 thus applies the message present therein at a transmission speed of 50,400 Bd. to coder C9, the scanning synchronization frequency of which is 1008T, wherein $T=8/3$ kHz. The outputs of coder C9 produce binary code pulse groups as described above, that are applied to distribution points 2, 6, 10, 14, 18, and 22. Selector Z4 of distributor V4 rotates at a speed of 8 kHz., and therefore the scanning synchronization frequency of the coders is a multiple of T, wherein $T=8/3$ kHz., these frequencies being derived from the PCM channel synchronization frequency of 1536 kHz.

If all 24 PCM channels are switched together into a data channel, approximately 200,000 Bd. can be transmitted. This is a step speed that is particularly suitable to the secondary band of a TF system and corresponds to a maximum information flow of 1536 k. bit/s. at output A of distributor V4.

If character-time-interleaving is employed in the embodiment of the invention shown in FIG. 5, coders C8 and C9 must have associated shift registers as explained above. The telegraphy distortion of the system shown in FIG. 5 is lower than 2%. However, if a 17% distortion is acceptable, only one half of the PCM channels need be employed, in contrast to the 24 PCM channels described above. Thus the method described according to the invention makes it possible to provide a simple switching forward of messages to similar or different systems. That is, local, district, and long distance systems are made compatible.

This is particularly shown with reference to FIG. 4, wherein intersection points among different systems are located between distributors V1, V2, and V3. Thus eight 50 Bd. channels are connected to distributor V1. Three similar systems (I, II, III) may be connected to distributor V1 or V2. Alternatively, instead of connecting systems I, II, and III thereto, directly scanned 50 Bd. channels may be connected to the distributors V1 and V2 as described above. Thus, eight 1200 Bd. channels may be connected to distributor V3, and all multiples of this transmission speed, as for example 2400, 4800, and 9600 Bd. may be developed. If these transmission speeds are then employed to transmit data, channels operating at these transmission speeds may be switched into connection. Thus, for example, the output of distributor V3 provides a rate of message or information flow which permits the seizing of a PCM channel, and therefore provides compatible operation between different systems.

What is claimed is:

1. A method of transmitting a plurality of binary coded message signals present in message channels in time multiplex manner to a common transmission path by scanning the message channels in response to scanning pulses to cyclically connect each message channel to the common transmission path during individual time slots comprising:
- deriving notification signals indicative of the times at which changes in the modulation condition of the plurality of binary coded message signals occur with respect to the immediately preceding time slot,
- initiating transmission of notification signals to the common transmission path in response to commencement of the succeeding time slot,
- transmitting the derived notification signals to the common transmission path during the time duration of more than one time slot associated with a binary coded message after initiating transmission thereof.

2. The method recited in claim 1 further comprising:
- counting the scanning pulses produced between successive time slots with a counter,
- resetting the counter to the zero condition when changes in the modulation condition of the message signals do not occur between successive time slots,
- stopping the counting of scanning pulses when a change in the modulation condition of the message signals occurs to derive notification signals corresponding to the count obtained.

3. The method recited in claim 2 further comprising:
- converting the count obtained to a corresponding binary coded pulse group,
- transmitting the corresponding binary coded pulse group to the common transmission path in response to the succeeding time slot.

4. The method recited in claim 3 further comprising:
- converting the count obtained to a corresponding binary coded pulse group comprising a plurality of information bits.

5. The method recited in claim 4 further comprising:
- producing corresponding binary coded pulse groups having similar first information bits indicating that at least some of the succeeding bits are to be evaluated to determine the time at which the modulation condition change occurs.

6. The method recited in claim 5 further comprising:
- terminating the binary coded pulse groups with an information bit indicative of the modulation condition existing after the occurrence of the change.

7. The method recited in claim 6 further comprising:
- utilizing binary coded pulse groups having safety bits to ensure correct evaluation thereof.

8. The method recited in claim 7 further comprising:
- transmitting a signal of a polarity opposite to that of the first information bit in response to commencement of a time slot when changes in the modulation condition do not occur between successive time slots.

9. The method recited in claim 7 further comprising:
- delaying transmission of a binary code pulse group indicative of a modulation condition change occurring during transmission of a preceding binary code pulse group until completing transmission of the latter.

10. The method recited in claim 9 further comprising:
- transmitting at predetermined time intervals a binary coded pulse group indicative of a particular message modulation condition existing for an extended period of time.

11. The method recited in claim 10 further comprising:
- delaying transmission of binary coded pulse groups by a time interval equal to the time duration thereof.

12. The method recited in claim 1 further comprising:
- setting the frequency of scanning pulses associated with messages transmitted at the lowest transmission speed to a predetermined frequency,
- increasing correspondingly the frequency of scanning pulses associated with messages transmitted at speeds greater than the lowest transmission speed.

13. The method recited in claim 3 further comprising:
- applying messages having different transmission speeds to the distribution points of a time multiplex distributor,
- varying the number of distribution points associated with the plurality of messages in direct relation to the transmission speeds thereof,
- connecting a common counter and coder to the output of the distributor to derive the notification signals.

14. The method recited in claim 13 further comprising:
- employing message transmission speeds compatible with existing systems associated with the time multiplex transmission system.

15. The method recited in claim 14 further comprising:
- forming message channels having transmission speeds compatible with utilizing a PCM system for message transmission.

16. The method recited in claim 15 further comprising:
- deriving the scanning pulse and transmission synchronization frequencies from the synchronization frequency of the PCM system,
- providing time multiplex distributor networks to combine at least some of the messages to enable utilization of a PCM channel for transmission of the plurality of messages.

17. The method recited in claim 16 further comprising:
- combining a plurality of PCM channels through time multiplex distributor networks to provide data channels of different data carrying capacity.

18. The method recited in claim 1 further comprising:
- transmitting a synchronization signal in a narrow auxiliary frequency range outside the transmission frequency range of the plurality of messages to synchronize the receivers to receive the correct messages in proper phase relationship.

19. The method recited in claim 18 further comprising:
- a 50 Bd. auxiliary channel.

20. The method recited in claim 1 further comprising:
- utilizing a predetermined modulation condition to effect transmission of synchronization signals to synchronize the receivers to receive the correct messages in proper phase relationship.

21. The method recited in claim 1 further comprising: connecting the message channels to a time multiplex distributor network having a plurality of distributors to produce intersection points therebetween compatible with sytems employing channels operating at transmission speeds different from the speed of the plurality of messages.

References Cited

UNITED STATES PATENTS

| | | | |
|---|---|---|---|
| 3,069,504 | 12/1962 | Kaneko | 178—69.5 |
| 3,230,509 | 1/1966 | Spencer | 178—50 |
| 3,261,001 | 7/1966 | Magin | 178—50 |
| 3,278,684 | 10/1966 | Geraghty et al. | 178—69 |
| 3,288,928 | 11/1966 | Bartlett et al. | 178—50 |

THOMAS A. ROBINSON, Primary Examiner

U.S. Cl. X.R.

178—69.5